United States Patent
Butler et al.

(10) Patent No.: US 12,024,403 B2
(45) Date of Patent: Jul. 2, 2024

(54) FASTENING SYSTEM FOR MOUNTING A CONSOLE OF A RAIL SYSTEM OF AN ELEVATOR INSTALLATION ON A WALL, RAIL SYSTEM AND MOUNTING METHOD

(71) Applicant: Inventio AG, Hergiswil (CH)

(72) Inventors: Erich Butler, Ebikon (CH); Romeo Lo Jacono, Gravesano (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/754,953

(22) PCT Filed: Oct. 22, 2020

(86) PCT No.: PCT/EP2020/079763
§ 371 (c)(1),
(2) Date: Apr. 18, 2022

(87) PCT Pub. No.: WO2021/078866
PCT Pub. Date: Apr. 29, 2021

(65) Prior Publication Data
US 2022/0371857 A1  Nov. 24, 2022

(30) Foreign Application Priority Data
Oct. 23, 2019 (EP) .................................... 19204909

(51) Int. Cl.
*B66B 7/02* (2006.01)
*F16B 43/02* (2006.01)
*F16B 5/02* (2006.01)

(52) U.S. Cl.
CPC .............. *B66B 7/022* (2013.01); *B66B 7/023* (2013.01); *B66B 7/024* (2013.01); *B66B 7/027* (2013.01); *F16B 43/02* (2013.01); *F16B 5/025* (2013.01)

(58) Field of Classification Search
CPC ......... B66B 7/022; B66B 7/023; B66B 7/024; B66B 7/027; F16B 43/02; F16B 5/025
See application file for complete search history.

(56) References Cited

U.S. PATENT DOCUMENTS

| | | | | |
|---|---|---|---|---|
| 1,345,358 A | * | 7/1920 | Silas | ...... F16B 43/02 411/537 |
| 2,120,462 A | * | 6/1938 | Ferguson | .................. E01B 7/10 411/531 |
| 5,469,938 A | | 11/1995 | Biewald et al. | |
| 5,542,777 A | * | 8/1996 | Johnson | .................. F16B 43/02 411/338 |

(Continued)

FOREIGN PATENT DOCUMENTS

| | | |
|---|---|---|
| CN | 106629322 B | 3/2019 |
| DE | 102006048655 A1 | 4/2008 |

(Continued)

*Primary Examiner* — Minh Truong
(74) *Attorney, Agent, or Firm* — William J. Clemens; Shumaker, Loop & Kendrick, LLP

(57) ABSTRACT

A fastening system has two fastening elements for mounting a bracket of a rail system of an elevator installation. The fastening elements each have a clamping plate having a through-hole and a receiving sleeve receiving an anchor bolt. The receiving sleeves each have a through-opening for the anchor bolt and an angularly movable ball joint is formed between the clamping plate and the receiving sleeve.

10 Claims, 5 Drawing Sheets

(56) References Cited

U.S. PATENT DOCUMENTS

| | | | | |
|---|---|---|---|---|
| 5,743,496 A | * | 4/1998 | Atkinson, Jr. | E01B 7/10 |
| | | | | 246/463 |
| 7,040,571 B1 | * | 5/2006 | Broberg | A63H 30/04 |
| | | | | 403/56 |
| 8,267,003 B1 | * | 9/2012 | Lou | F41H 5/013 |
| | | | | 89/929 |
| 9,126,631 B2 | * | 9/2015 | Lungershausen | F16B 5/0241 |
| 2004/0101384 A1 | * | 5/2004 | Schilling | F16B 43/02 |
| | | | | 411/537 |
| 2013/0259600 A1 | * | 10/2013 | Kerechanin, II | F16B 5/0216 |
| | | | | 411/537 |

FOREIGN PATENT DOCUMENTS

| | | | | |
|---|---|---|---|---|
| FR | 2684086 A1 | * | 5/1993 | B66B 7/02 |
| FR | 2996216 A1 | | 4/2014 | |
| JP | 07215627 A | * | 8/1995 | B66B 7/024 |
| JP | 2006036450 A | | 2/2006 | |
| JP | 2006255941 A | | 9/2006 | |
| JP | 2015054754 A | | 3/2015 | |
| WO | WO-2016198339 A1 | * | 12/2016 | |

\* cited by examiner

FASTENING SYSTEM FOR MOUNTING A CONSOLE OF A RAIL SYSTEM OF AN ELEVATOR INSTALLATION ON A WALL, RAIL SYSTEM AND MOUNTING METHOD

FIELD

The present invention relates to a fastening system having two fastening elements for mounting a console or a bracket of a rail system of an elevator installation on a wall, to a rail system for an elevator installation and to a method for mounting a console or a bracket of a rail system of an elevator installation on a wall.

BACKGROUND

A bracket is part of a substructure for a rail system of an elevator installation. The bracket is also sometimes referred to as a console. A plurality of brackets can be arranged along a direction of extent of the rail system. The brackets are fastened to a wall, for example an elevator shaft. So that the rail system can be constructed as straight as possible, the brackets are aligned in a plurality of axes during assembly.

FR 2 996 216 shows a fastening of a wall-mounted elevator guide.

The alignment can take place, for example, by relative movement of elements which are screwed to one another. The movement can be made possible by means of at least one elongate hole which is aligned transversely to the axis to be aligned in at least one of the elements. A relative position of the aligned elements can be secured, for example, using a dowel pin inserted through both elements.

SUMMARY

There may be a need, inter alia, for an improved fastening system, an improved rail system and an improved method for mounting a bracket of a rail system of an elevator installation on a wall.

Such a need can be met by way of a fastening system having two fastening elements for mounting a bracket of a rail system of an elevator installation on a wall, a rail system for an elevator installation and a corresponding method for mounting a bracket of a rail system of an elevator installation on a wall according to the advantageous embodiments that are defined in the following description.

According to a first aspect of the invention, a fastening system for a bracket of a rail system of an elevator installation is proposed, wherein the fastening system comprises two fastening elements, an anchor bolt and at least two nuts, wherein each fastening element for mounting a bracket of a rail system of an elevator installation has a clamping plate having a through-hole and a receiving sleeve for receiving the anchor bolt, wherein the receiving sleeve has a through-opening for the anchor bolt and an angularly movable ball joint is formed between the clamping plate and the receiving sleeve, and wherein the anchor bolt can be anchored in a wall and has an external thread, the nuts can be screwed onto the external thread, and the fastening elements can be arranged between the nuts on the anchor bolt, wherein the bracket can be positioned, aligned and clamped between the fastening elements.

According to a second aspect of the invention, a rail system for an elevator installation is proposed, wherein the rail system has a bracket which is fastened to a wall using at least one fastening system according to the first aspect of the invention, wherein the bracket has at least one opening through which an anchor bolt anchored in a wall is guided, wherein the opening is larger than a diameter of the anchor bolt by a positioning tolerance and an edge of the opening is clamped between two fastening elements according to the second aspect of the invention, which elements are pushed onto the anchor bolt, wherein the fastening elements are clamped between two nuts which are locked on the anchor bolt.

According to a third aspect of the invention, a method for mounting a bracket of a rail system of an elevator installation on a wall using a fastening system according to the first aspect of the invention having two fastening elements is proposed, wherein the fastening elements each have a clamping plate having a through-hole and a receiving sleeve for an anchor bolt, wherein the receiving sleeve has a through-opening for the anchor bolt and an angularly movable ball joint is arranged between the clamping plate and the receiving sleeve, wherein the anchor bolt is anchored in the wall, a first nut is screwed onto an external thread of the anchor bolt, the first fastening element having the receiving sleeve is pushed onto the anchor bolt until the receiving sleeve abuts the first nut, the anchor bolt is guided through an opening in the bracket until an edge of the opening abuts the clamping plate of the first fastening element, wherein the second fastening element having the clamping plate is pushed onto the anchor bolt until the clamping plates touch the edge and a second nut is screwed onto the external thread in order to clamp the bracket between the fastening elements, wherein in order to align the bracket, a distance between the bracket and the wall is set by adjusting the first and second nuts on the external thread, a vertical and a horizontal position of the bracket is set by moving the bracket within a positioning tolerance which is predetermined by the size of the opening and an angular misalignment between the bracket and the anchor bolt is compensated for by rotating the ball joints, wherein the nuts are locked in place after the alignment in order to fix the bracket between the fastening elements.

Possible features and advantages of embodiments of the invention can be considered, inter alia and without limiting the invention, to be based upon the concepts and findings described below.

An elevator installation can be a passenger transport installation which transports passengers substantially vertically. The elevator installation can be arranged, for example, within an elevator shaft of a building. The elevator installation can also be arranged on the outside of a building. The elevator installation can have at least one vertically movable car. The car can be moved back and forth between many levels or floors of the building. The elevator shaft can have one landing point per connected level. The car can be guided by a rail system connected to the building.

A bracket can be a structural element of the rail system. The bracket can be arranged between the rails of the rail system and the building. The bracket can be a load-bearing element of the rail system. The rail system can be connected to a wall of the building or the elevator shaft using a plurality of brackets. The bracket can be a crossbeam of the rail system. The bracket can be made of a metal material. The bracket can for example be made of a shaped metal sheet. The bracket can have a substantially U-shaped profile. Further components of the rail system or the elevator installation can be fastened to the bracket.

Using the fastening system presented here or two of the fastening elements presented here, the bracket can be connected to an anchor bolt which is anchored in the wall. The anchor bolt can have an external thread over a large part of its length. The external thread can be a metric thread. In the case of an outer diameter of the anchor bolt of 16 millimeters, the external thread can be an M16 thread, for example. The nuts can have an internal thread which fits with the external thread. The anchor bolt can be a heavy-load anchor which is fastened in a hole in the wall. The anchor bolt can have at least one expansion element and an expansion cone. The expansion element can slide on the expansion cone and be pressed against a side surface of the hole. As a result, the anchor bolt can transfer high tensile forces in particular to the wall. The expansion element can be expanded by tightening a nut which abuts the wall. A washer can be arranged between the nut and the wall. Alternatively or in addition, the anchor bolt can also be glued into the hole.

The clamping plate can be circular. The clamping plate can have an annular clamping surface. A recess in the form of a through-hole for the anchor bolt can be arranged in the center of the clamping surface. The clamping surface can be flat. The receiving sleeve can have a contact surface for the nut which is screwed onto the anchor bolt acting as a wall anchor. The contact surface can be aligned transversely to the through-opening. The through-opening can have a slightly larger diameter than the external thread of the anchor bolt. In a neutral position of the ball joint, the clamping surface can be aligned perpendicularly to a central axis of the through-opening.

An opening in the bracket can be a large hole. The opening can be circular, for example. The opening can be many times larger than a diameter of the wall anchor. The opening can be stamped out of the bracket. Alternatively, the opening can be cut from the bracket by means of laser cutting. If the anchor bolt is arranged centrally in the opening, a distance between an edge or a rim of the opening and the wall anchor forms the positioning tolerance in the direction of the distance.

The bracket can be clamped between two clamping plates of two fastening elements held between two nuts which are screwed onto the anchor bolts. In order to clamp the edge surrounding the through-hole in the bracket, the second nut is initially not firmly tightened. If the edge is clamped between the clamping surfaces, the bracket can be moved between the fastening elements within the positioning tolerance since the clamping surfaces are pressed against the bracket by means of a low clamping force.

A ball joint can have two joint surfaces which can move relative to one another in at least two spatial directions. Two components forming the ball joint can thus be moved relative to one another in different orientations. The joint surfaces can be complementary to one another. The joint surfaces can be shaped as sub-regions of spherical surfaces having the same radius. The sub-regions can be of different sizes. The sub-regions can also be of the same size. The ball joint can, for example, be inserted between the receiving sleeve and the clamping plate. The joint surfaces can also be formed by the components adjoining one another, i.e., by the receiving sleeve and the clamping plate itself.

An angular misalignment can occur, for example, due to a wall anchor being anchored in the wall at an angle. The angular misalignment can also be caused by the shape of the wall.

When rotating the ball joints, the fastening elements can slide on the bracket. Due to the rotation within the ball joints, the movement within the opening and the movement along the anchor bolt, the bracket can be aligned in all spatial directions.

When being locked, at least two nuts on the same external thread of the anchor bolt are moved toward one another in different directions of rotation, thus reducing the distance between the nuts. The fastening elements, located between the nuts, and the bracket are pressed together and the position and angular position reached by the bracket are fixed by means of the resulting frictional connection. The ball joints are also pressed together and thus fixed in their current angular position.

The bracket can have at least one alignment notch. Before locking the nuts, the bracket can be aligned using the alignment notch and a plumb line. An alignment notch can be a marking which is formed by at least one recess and/or at least one projection of the bracket. During alignment, the alignment notch can be aligned, for example, to a laser beam from a laser plumb line or a cord from a cord plumb line such that the rails of the rail system extend perpendicularly and in a straight line.

The fastening system can comprise at least one spring washer. One or more spring washers can be arranged on the anchor bolt between the second fastening element and the second nut. The spring washer can be pretensioned by pre-tightening the second nut in order to clamp the bracket between the clamping plates. A spring washer can be a washer having a three-dimensional pre-deformation in the relaxed state. The spring washer can, for example, be slotted and have a spiral shape in the relaxed state. Alternatively, an outer edge of the spring washer can be bent in relation to an inner edge of the spring washer. When pre-tightening, the spring washer is at least minimally pressed flat by a spring deflection and reacts to this deformation by the spring deflection with a counterforce. Moving the bracket between the clamping plates can be simplified by means of the spring washer because the clamping force corresponds to the counterforce.

A concave abutment of the ball joint can be formed in the clamping plate. A convex pressure piece of the ball joint can be formed on the receiving sleeve. Conversely, a concave pressure piece can be formed in the receiving sleeve and a convex abutment can be formed on the clamping plate. The ball joint can thus be formed by the clamping plate and the correspondingly shaped receiving sleeve. The fastening element can only consist of two parts. The abutment and the pressure piece can each form a sub-region of a spherical surface. The abutment and the pressure piece can form sub-regions of the spherical surface of different sizes. The spherical surfaces can have the same radius. The sub-regions can each correspond to the surface of a spherical layer.

The concave abutment can be approximately hemispherical. Alternatively or in addition, the convex pressure piece can be approximately hemispherical. A large angle adjustment range can be achieved by means of a hemispherical shape. For example, an angle adjustment range of $\pm 20°$ can be achieved. In particular, an angle adjustment range of $\pm 15°$ can be achieved. In particular, an angle adjustment range of $\pm 10°$ can be achieved.

The through-hole through the clamping plate can be larger than the through-opening in the receiving sleeve in order to allow angular movement of the ball joint when the anchor bolt is received in the through-opening. The through-hole can correspond to the recess in the clamping surface. The through-hole can connect the abutment of the ball joint to the clamping surface. The through-hole can, for example, have a diameter of between 30 millimeters and 40 millimeters. In particular, the through-hole can have a diameter of 35 millimeters. The through-hole can be conical.

The clamping surface of the clamping plate can be significantly larger than a rear side of the clamping plate opposite the clamping surface. An edge of the clamping plate can be approximately pointed. A side surface of the clamping plate can be aligned at an angle to the clamping surface. The side surface can be frustoconical. Due to the inclined side surface, material can be saved and the weight of the fastening element can be reduced as required.

The clamping plate can have a diameter of between 12 centimeters and 15 centimeters. The diameter of the clamping plate can in particular be 13 centimeters. The diameter of the clamping plate can be significantly larger than a diameter of the opening in the bracket. The opening can, for example, have a diameter of 10 centimeters. Due to the larger diameter, the clamping plate does not fit through the opening and securely abuts the edge of the opening in all positions of the positioning tolerance. In extreme positions, the clamping plate can also abut only a sub-region of the edge.

The bracket can have at least one further opening through which a further anchor bolt anchored in the wall is guided. An edge of the further opening can be clamped between two further fastening elements according to the second aspect of the invention, which elements are pushed onto the anchor bolt. The further fastening elements can be clamped between two nuts which are locked on the further anchor bolt. The bracket can be connected to the wall at at least two anchor bolts. As a result, the bracket can be secured against rotation. The ball joints in particular mean that additional fastening points can be dispensed with since the bracket can be aligned in all spatial directions.

It should be noted that some of the possible features and advantages of the invention are as described herein with reference to different embodiments. A person skilled in the art recognizes that the features of the mounting method, the fastening element and the bracket can be combined, adapted or replaced as appropriate in order to arrive at further embodiments of the invention.

Embodiments of the invention will be described below with reference to the accompanying drawings, with neither the drawings nor the description being intended to be interpreted as limiting the invention.

The drawings are merely schematic and not true to scale. Identical reference signs refer to identical or equivalent features in the various drawings.

DETAILED DESCRIPTION

Figure 1:
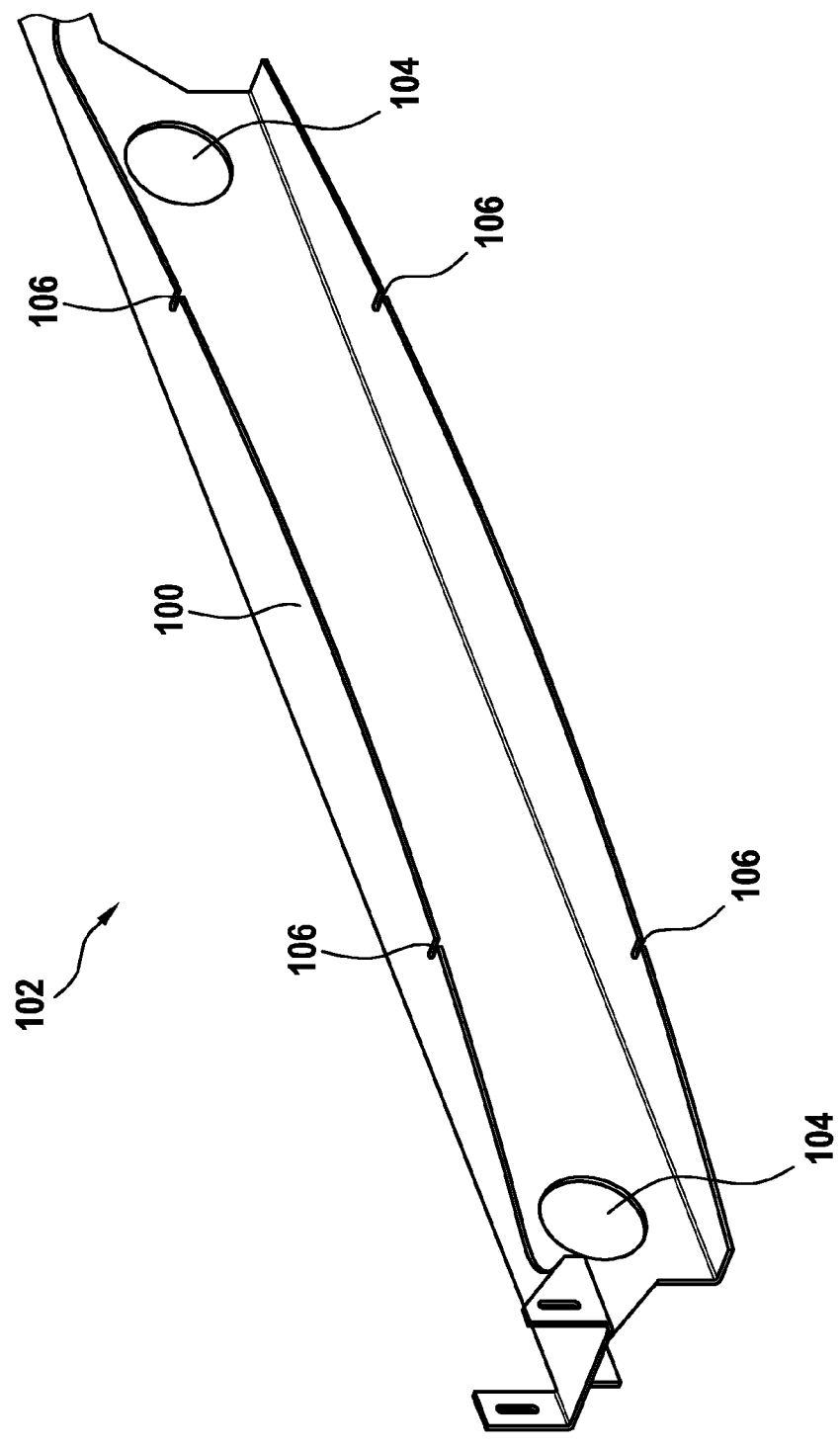
FIG. 1 shows a perspective view of a bracket for a rail system according to an embodiment.

FIG. 1 shows a perspective view of a bracket 100 for a rail system 102 according to an embodiment. The bracket 100 is shown in an unmounted state. The bracket 100 is a crossbeam of the rail system 102 of an elevator installation. The bracket 100 is made of sheet metal. For example, the bracket 100 is designed as a stamped and bent part. The sheet metal of the bracket is here, for example, five millimeters thick. The bracket 100 is substantially U-shaped or C-shaped in order to have an increased bending resistance. As a result of the profile, the bracket has a bottom surface and two side surfaces which are bent in the same direction from the bottom surface. The side surfaces have a lower height at opposite end regions than in the middle, i.e., they are rounded or arcuate.

The bracket 100 has two openings 104 in the end regions. The openings 104 are circular here and have a diameter of 100 millimeters. The openings 100 are arranged in the bottom surface of the bracket 100. The openings 104 are arranged centrally between the side surfaces.

One of the side surfaces has a widened surface at each of the end regions with tabs pointing away from the bracket. The tabs each have an elongate hole which is aligned transversely to a main direction of extent of the bracket 100.

In an embodiment, the side surfaces in the vicinity of the end regions each have an alignment notch 106. The alignment notches 106 of an end region are each arranged on a common line perpendicular to the main direction of extent. The alignment notches 106 are designed here as U-shaped grooves in the edges of the side surfaces. The alignment notches 106 can also be designed as projections over the edge of the side surfaces.

Figure 2:
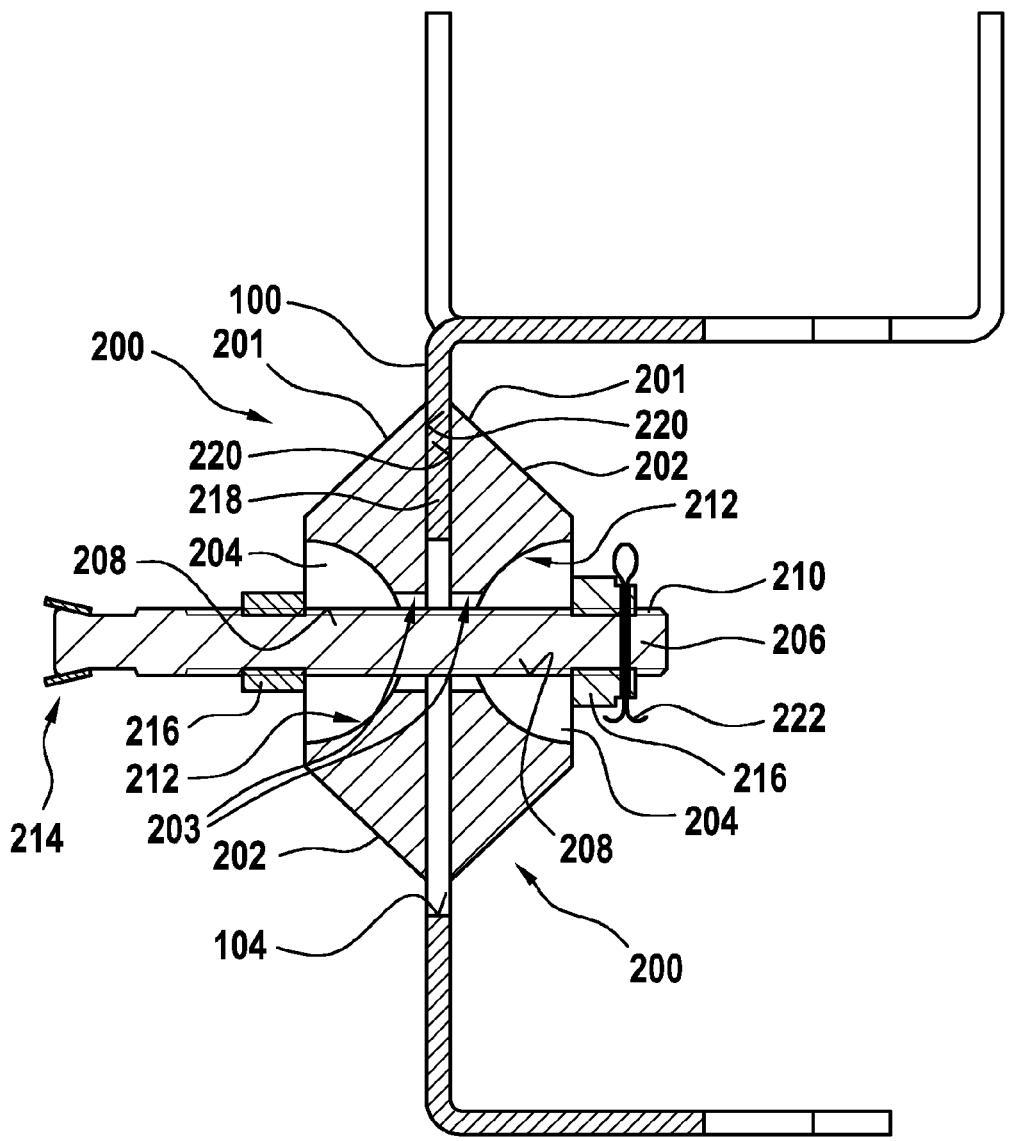
FIG. 2 shows a sectional view through a fastening system according to an embodiment.

FIG. 2 shows a sectional view through a mounted fastening system 200 according to an embodiment. The fastening system 200 comprises two fastening elements 201 according to one aspect of the invention. The fastening elements 201 are arranged on opposite sides of the bottom surface of a bracket 100 which substantially corresponds to the illustration in FIG. 1. The fastening elements 201 each have a clamping plate 202 having a through-hole 203 and a receiving sleeve 204 for an anchor bolt 206. The receiving sleeves 204 each have a through-opening 208 for the anchor bolt 206. The through-openings 208 have a slightly larger diameter than an external thread 210 of the anchor bolt 206. A ball joint 212 is formed between a receiving sleeve 204 and the associated clamping plate 202.

The anchor bolt 206 is designed here as a heavy-load anchor and has a clamping device 214 at one end. The end is arranged in a hole (not shown here) in a wall (not shown) and anchored in the wall using the clamping device 214. The opposite end of the anchor bolt 206 then protrudes from the wall. A first nut 216 is screwed onto the external thread 210 and the first fastening element 201 having the receiving sleeve 204 is pushed onto the anchor bolt 206 until the receiving sleeve 204 abuts the first nut 216. The anchor bolt 206 is then guided through the opening 104 and an edge 218 of the opening 104 abuts a clamping surface 220 of the clamping plate 202.

The fastening system 200 thus consists of the two fastening elements 201, the anchor bolt 206 and the at least two nuts 216. The fastening system 200 can, for example, be pre-assembled. The components of the fastening system 200 can be arranged on the anchor bolt 206 in a loss-proof manner. The anchor bolt can also be anchored in the wall by means of the nuts 216 and fastening elements 201 arranged thereon. To assemble the bracket 100, only the second nut 216 and the second fastening element 201 are then removed and the bracket 100 pushed on.

The second fastening element 201 having the clamping plate 202 is then pushed onto the anchor bolt 206 until the clamping surface 220 abuts an opposite side of the edge 218.

The second fastening element 201 is secured by a second nut 216. The second nut 216 is only tightened slightly so that the bracket 100 can be moved between the fastening elements 201. When a position and location or orientation of the bracket is aligned in all spatial directions, the nuts 216 are locked and tightened using the required torque. As a result, the fastening elements 201 are pressed against the bracket 100 and the position and location or orientation are fixed.

In an embodiment, the second nut 216 is a castle nut. When the nuts 216 are locked, the anchor bolt 206 is pierced transversely between the prongs of a crown of the castle nut and a split pin 222 is pushed through the hole and the crown. Due to the split pin 222, the second nut 216 cannot loosen and is secured against loss.

Figure 3:
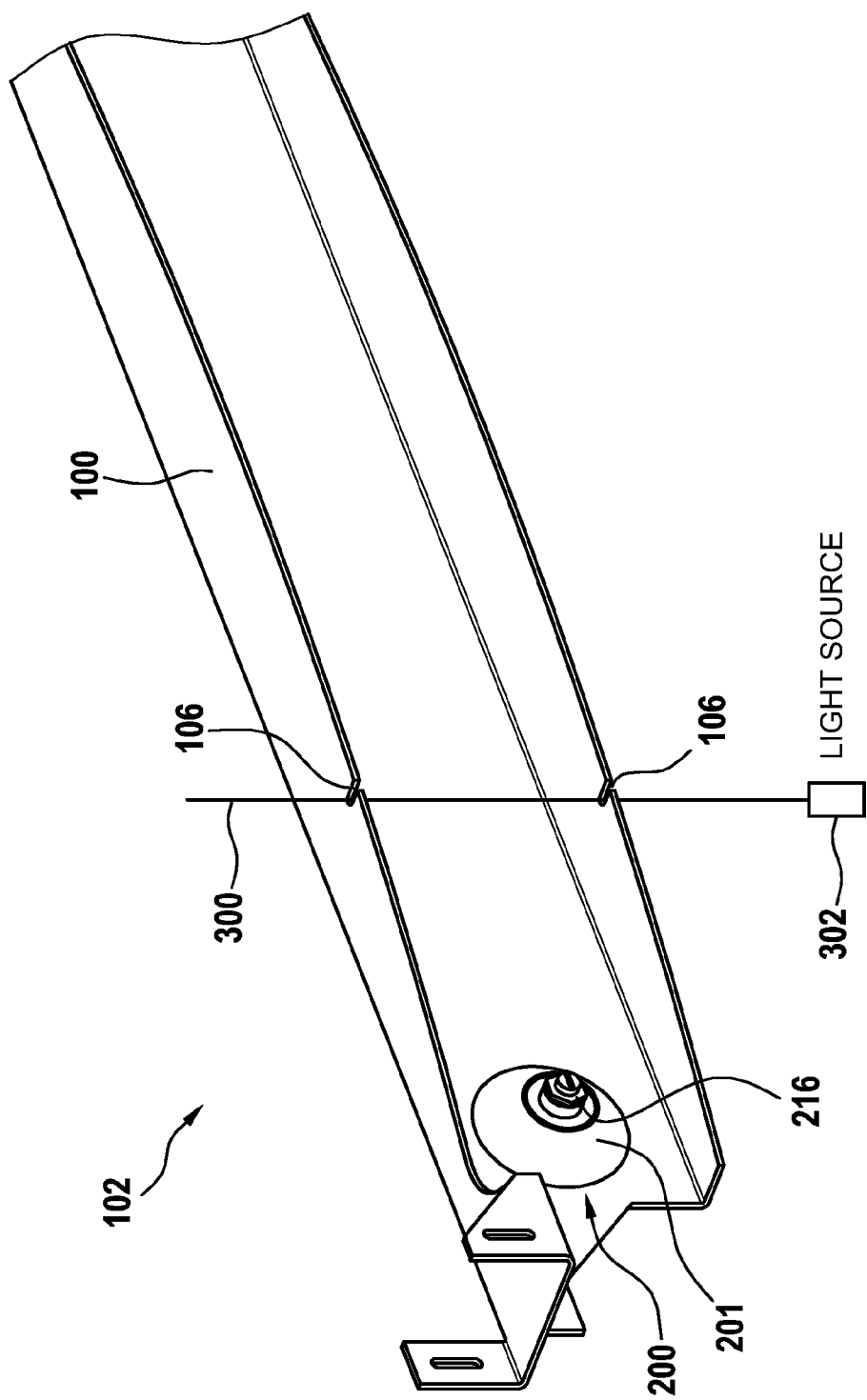
FIG. 3 shows a perspective view of a fastening system during alignment according to an embodiment.

FIG. 3 shows a three-dimensional view of a fastening system 200 during alignment according to an embodiment. The bracket 100 substantially corresponds to the illustrations in FIGS. 1 and 2. Here, a laser beam 300 is used to spatially align the bracket 100. The laser beam 300 is emitted vertically upward from a light source 302 at a lower end of the rail system 102. The laser beam 300 is arranged at a point at which the alignment notches 106 of the bracket 100 are to be arranged according to the design. The bracket 100 is then moved and rotated using the fastening elements 201 and the nuts 216 until the laser beam 300 extends through the alignment notches 106.

Instead of the laser beam 300, a cord of a cord plumb line can also be used, which cord is fastened to an upper end of the rail system 102 and hangs vertically downward.

In order to align the bracket 100, two different laser beams 300 from different light sources 302 can be used for the right and left alignment notches. Alternatively, the upwardly emitted laser beam 300 can be deflected laterally at an upper end of the rail system 102 using a mirror apparatus and be directed downward again at the point at which the other alignment notches 106 are to be arranged according to the design.

Figure 4:
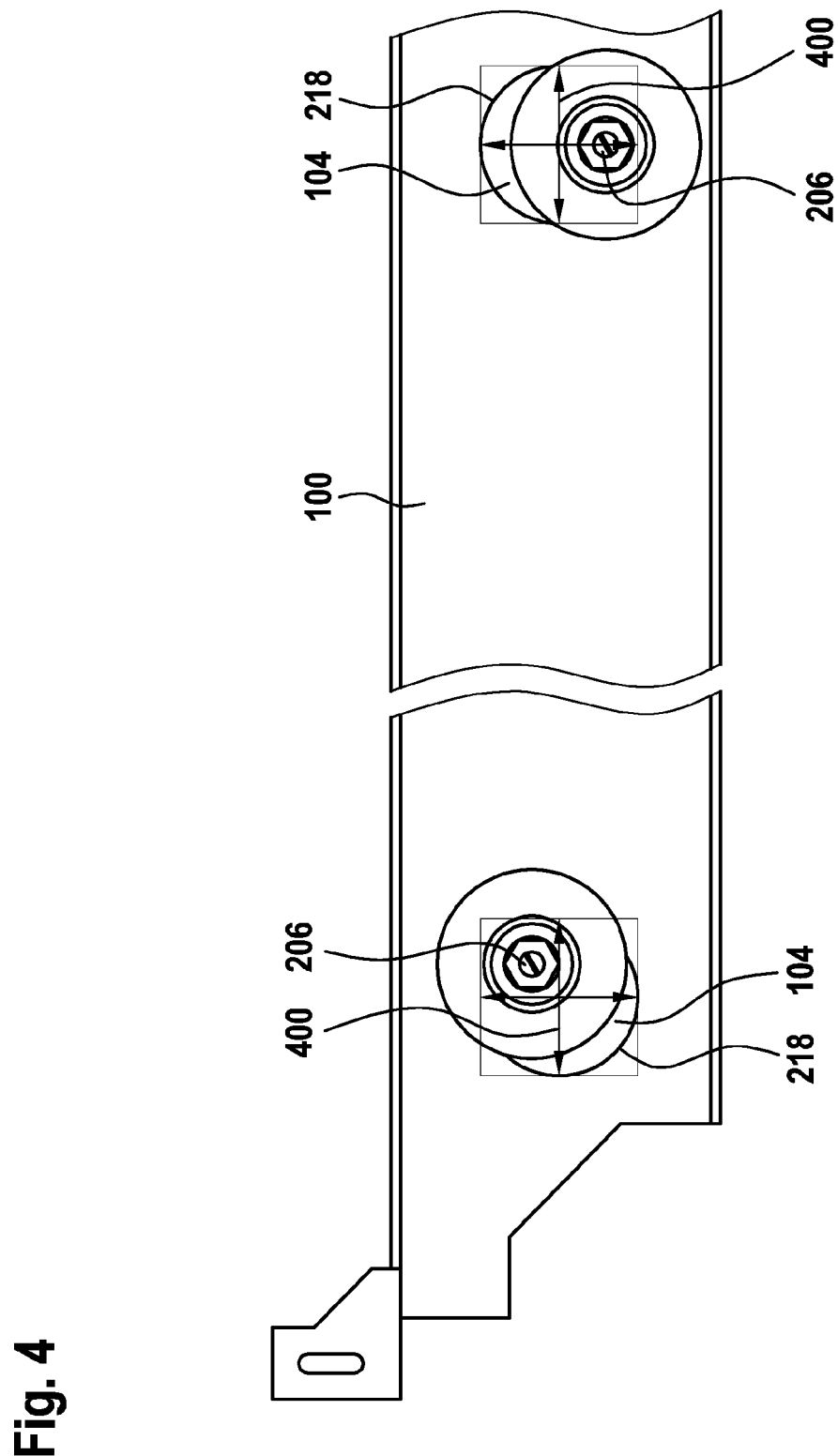
FIG. 4 shows a view of an aligned bracket of a rail system according to an embodiment.

FIG. 4 shows a view of an aligned bracket 100 according to an embodiment. The bracket 100 substantially corresponds to the illustrations in the previous figures. Here, the anchor bolts 206 were placed imprecisely and the inaccuracies during the alignment were compensated for by utilizing a positioning tolerance 400 of the openings 104. A upper side of the bracket 100 has been aligned horizontally.

The anchor bolt 206 on the left in the illustration has been placed too far to the right and too far up. The anchor bolt 206 on the right in the illustration has been placed too far down. Due to the large positioning tolerance 400 of substantially 50 millimeters in the Y-direction and Z-direction, i.e., left/right and up/down, the left anchor bolt 206 can be arranged offset to the top right in the right opening 104, while the right anchor bolt 206 can be arranged offset to the bottom in the opening 104. Since the positioning tolerance 400 has been used to a great extent here, the clamping surfaces only rest on the edge 218 of the openings 104 in some regions.

Figure 5:
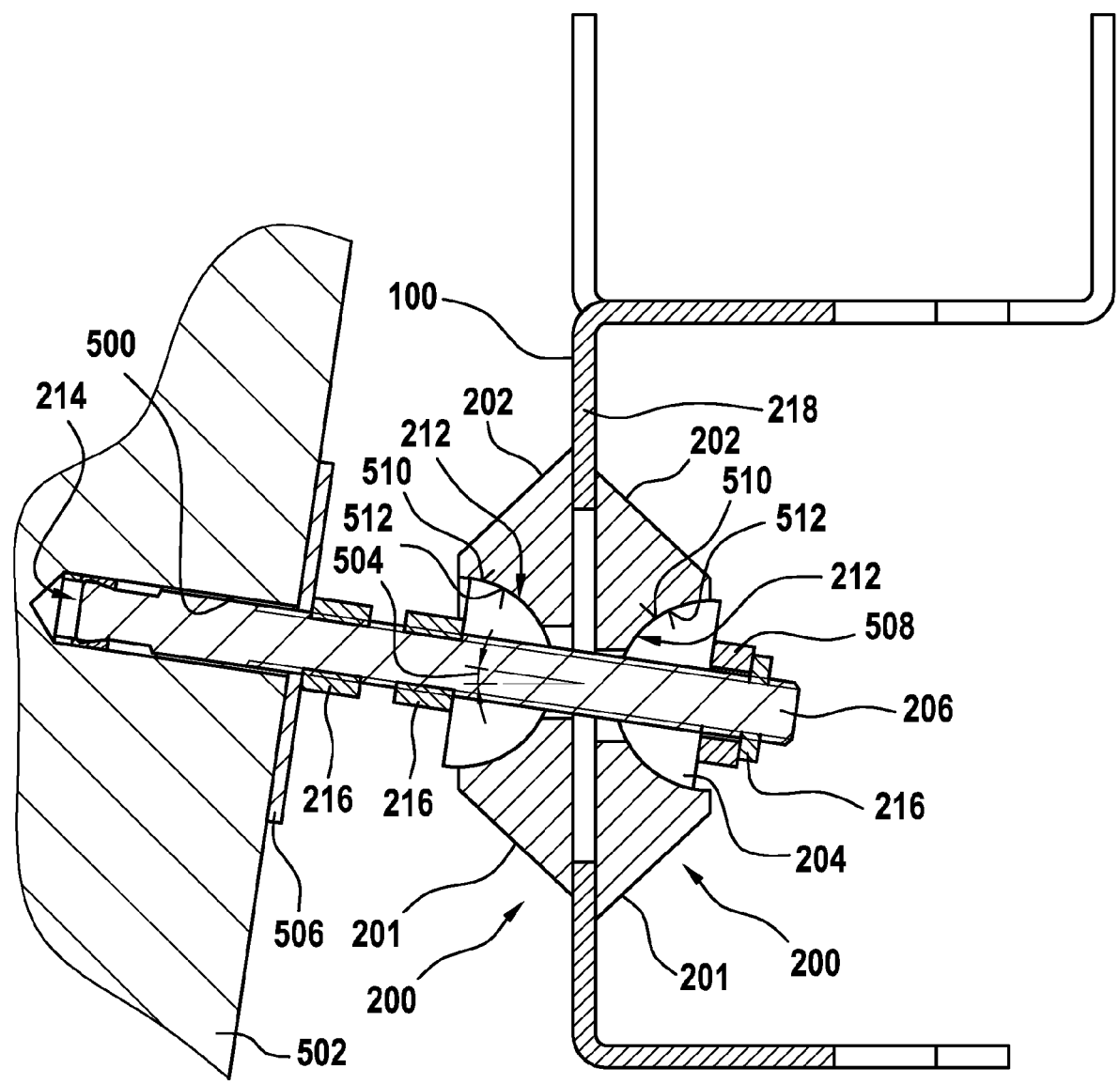
FIG. 5 shows a sectional view through an aligned fastening system according to an embodiment.

FIG. 5 shows a sectional view through an aligned fastening system 200 according to an embodiment. The illustration substantially corresponds to the illustration in FIG. 2. In contrast to this, a hole 500 has been placed in a wall 502 due to an unevenness of the wall 502 with an angular misalignment 504 of 10° to the horizontal such that the anchor bolt 206 is oriented perpendicular to the surface of the wall 502. A large washer 506 rests on the surface, against which washer a further nut 216 is screwed in order to clamp the clamping device 214 against the side surface of the hole 500. In order to compensate for the angular misalignment 504 of the anchor bolt 206, the ball joints 212 are deflected by 10°. Since the receiving sleeves 204 are guided through the anchor bolt 206, there is a height misalignment of the two fastening elements 201.

In an embodiment, a spring washer 508 is arranged between the second nut 216 and the receiving sleeve 204 of the second fastening element 201. The spring washer 508 is designed here as a slotted washer. In the locked state shown here, the spring washer 508 is compressed to the maximum and thus lies flat against the receiving sleeve 204 and the nut 216.

To align the bracket 100, the second nut 216 is only screwed against the spring washer 508 with a low aligning torque in order to achieve such a low clamping force of the clamping disks 202 on the edge 218 that the edge 218 can be moved between the clamping disks 202.

In an embodiment, the clamping plates 202 each have a recess as an abutment 510 of the ball joint 212, which recess at least approximately forms a spherical portion, while the receiving sleeves 204 each have a projection as a pressure piece 512, which projection at least approximately forms the spherical portion. Here the abutment 510 and the pressure piece 512 are hemispherical.

In other words, FIGS. 1 to 5 show a fastening element or a fastening system formed therewith, by means of which consoles or brackets can be fastened to a wall. The fastening element can be referred to as a spherical disk. Two fastening elements can be locked on an anchor bolt and allow the position of the console or bracket to be set in six dimensions.

The alignment and position can be set using plumb lines. For this purpose, the consoles or brackets can be moved spatially using the fastening elements in order to allow alignment. In this way, tolerances of the elevator shaft can be compensated for. The alignment is carried out using two anchor bolts, a ball joint and two large holes in the console or bracket. The distance from the wall is set using the nuts on the anchor bolts. The translation occurs within the large holes. Rotations occur in the spherical joint.

As a result, the console or bracket can be freely placed spatially and precise alignment can be ensured regardless of the tolerances of the elevator shaft and the anchor bolts. When the console or bracket is aligned, the nuts on the ball joints are tightened in order to press the system together and fix it in place.

Finally, it should be noted that terms such as "comprising," "having," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A fastening system for a bracket of a rail system of an elevator installation, the fastening system comprising:
   two fastening elements;
   an anchor bolt;
   at least two nuts;
   wherein each of the fastening elements has a clamping plate with a through-hole formed therein receiving the anchor bolt, a receiving sleeve with a through-opening formed therein receiving the anchor bolt, and an angularly movable ball joint formed between the clamping plate and the receiving sleeve, where each clamping plate has a flat clamping surface facing the bracket, and where the flat clamping surface of the clamping plate of at least one of the fastening elements has a diameter which is larger than a diameter of the ball joint formed between the clamping plate and the receiving sleeve;

wherein the anchor bolt has an external thread, the nuts are screwed onto the external thread, and the fastening elements are arranged between the nuts on the anchor bolt;

wherein the bracket has an opening with a diameter larger than a diameter of the anchor bolt;

when the anchor bolt is anchored in a wall of the elevator installation and the bracket is positioned between the fastening elements with the anchor bolt extending through the opening, the bracket is aligned relative to the wall prior to locking the nuts on the anchor bolt to clamp the bracket between the fastening elements;

wherein at least one of the fastening elements has a concave abutment of the ball joint formed in the clamping plate and a convex pressure piece of the ball joint formed on the receiving sleeve; and wherein the concave abutment is approximately hemispherical and the convex pressure piece is approximately hemispherical.

2. The fastening system according to claim 1 wherein the through-hole of the clamping plate of at least one of the fastening elements is larger than the through-opening of the receiving sleeve allowing angular movement of the ball joint when the anchor bolt is received in the through-opening.

3. The fastening system according to claim 1 wherein at least one of the clamping plates is shaped as a disk having a diameter in a range of 12 centimeters to 15 centimeters.

4. The fastening system according to claim 1 including a spring washer arranged on the anchor bolt between one of the nuts and one of the fastening elements.

5. A rail system for an elevator installation, the rail system comprising:
a bracket;
the fastening system according to claim 1 fastening the bracket to a wall of the elevator installation; and
wherein the opening in the bracket through which the anchor bolt of the fastening system is guided is larger than the diameter of the anchor bolt by a positioning tolerance and an edge of the opening is clamped between the two fastening elements of the fastening system, and the two fastening elements are clamped between the two of the nuts that are locked on the anchor bolt.

6. The rail system according to claim 5 wherein the bracket has another opening through which another anchor bolt of another of the fastening system is guided, an edge of the another opening is clamped between two fastening elements of the another fastening system, and the two fastening elements of the another fastening system are clamped between the two of the nuts that are locked on the another anchor bolt.

7. A method for mounting a bracket of a rail system of an elevator installation on a wall, the method comprising the steps of:
providing the fastening system according to claim 1 having the two fastening elements, the anchor bolt and the at least two nuts;
anchoring the anchor bolt in the wall;
screwing a first of the nuts onto the external thread of the anchor bolt;
pushing a first of the fastening elements onto the anchor bolt until the receiving sleeve of the first fastening element abuts the first nut;
guiding the anchor bolt through an opening in the bracket until an edge of the opening abuts the clamping plate of the first fastening element;
pushing a second of fastening elements onto the anchor bolt until the clamping plate of the second fastening element touches the edge of the opening;
screwing a second of the nuts onto the external thread of the anchor bolt until the bracket is clamped between the first and second fastening elements to permit aligning movement of the bracket relative to the wall;
aligning the bracket by setting a distance between the bracket and the wall by adjusting the first and second nuts on the external thread, setting a vertical position and a horizontal position of the bracket by moving the bracket within a positioning tolerance predetermined by a size of the opening, and compensating for an angular misalignment between the bracket and the anchor bolt by rotating the ball joints; and
locking the first and second nuts in place on the anchor bolt after the aligning is performed to fix the bracket between the first and second fastening elements.

8. The method according to claim 7 wherein the bracket has at least one alignment notch, the bracket being aligned using the alignment notch and a plumb line prior to locking the first and second nuts.

9. The method according to claim 7 including arranging a spring washer on the anchor bolt between the second fastening element and the second nut, and pretensioning the spring washer by pre-tightening the second nut to clamp the bracket between the clamping plates.

10. A fastening system for a bracket of a rail system of an elevator installation, the fastening system comprising:
two fastening elements;
an anchor bolt;
at least two nuts;
wherein each of the fastening elements has a clamping plate with a through-hole formed therein receiving the anchor bolt, a receiving sleeve with a through-opening formed therein receiving the anchor bolt, and an angularly movable ball joint formed between the clamping plate and the receiving sleeve;
wherein the anchor bolt has an external thread, the nuts are screwed onto the external thread, and the fastening elements are arranged between the nuts on the anchor bolt;
wherein the fastening elements each have a concave abutment of the ball joint formed in the clamping plate and a convex pressure piece of the ball joint formed on the receiving sleeve, the concave abutment being approximately hemispherical and the convex pressure piece being approximately hemispherical; and
when the anchor bolt is anchored in a wall of the elevator installation and the bracket is positioned between the fastening elements, the bracket can be aligned relative to the wall prior to locking the nuts on the anchor bolt to clamp the bracket between the fastening elements.

* * * * *